W. BERECKY AND G. MUNTEANU.
SOFT COLLAR HOLDER.
APPLICATION FILED OCT. 14, 1920.
1,374,485.
Patented Apr. 12, 1921.
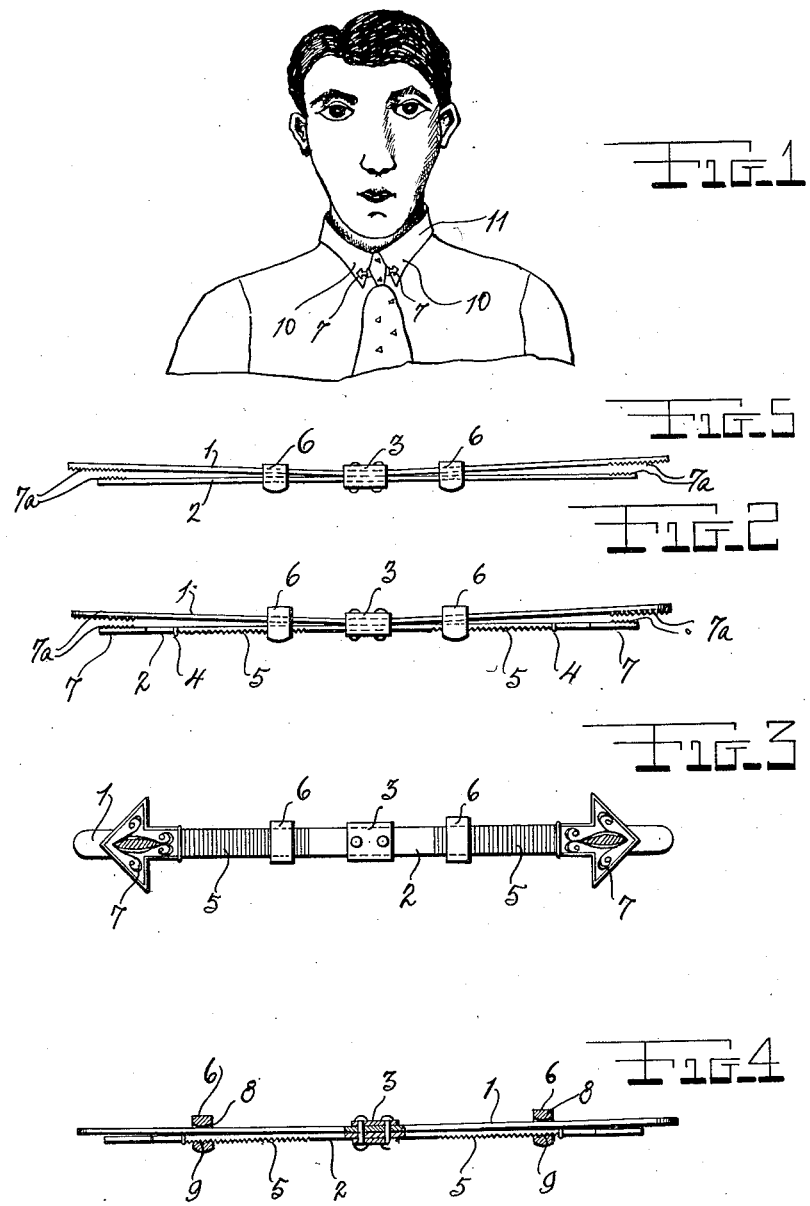

UNITED STATES PATENT OFFICE.

WILLIAM BERECKY AND GEORGE MUNTEANU, OF NEW YORK, N. Y.

SOFT-COLLAR HOLDER.

1,374,485. Specification of Letters Patent. Patented Apr. 12, 1921.

Application filed October 14, 1920. Serial No. 416,933.

*To all whom it may concern:*

Be it known that we, WILLIAM BERECKY and GEORGE MUNTEANU, citizens of the United States, residing at New York, in the county of New York and State of New York, have invented certain new and useful Improvements in Soft-Collar Holders, of which the following is a specification.

The main object of this invention is the provision of a soft-collar fastener of novel design and construction, which is so used as to prevent injury or damage to the collar so as to diminish the life of the latter, and which is at the same time easily attached or removed and in a minimum of time.

The above and other objects will become apparent in the description below, in which like characters of reference refer to like-named parts in the drawings.

Referring briefly to the drawings, Figure 1 is a view illustrating the application of our device.

Fig. 2 is an enlarged plan view of our device, in open position.

Fig. 3 is a similar front view of the same.

Fig. 4 is a similar plan view of the same, in locked position, partly in section.

Fig. 5 is an enlarged plan view of a modified form of our device.

Referring now in detail to the drawings, the numeral 1 represents the rear member of our device, and 2 the front member, both being constructed of resilient material, the former being of slightly greater length than the latter. Said members are rigidly jointed at their centers by a clamp 3.

The front surface of the member 2 is provided with serrations 5 for a distance on either side of the clamp 3, a ridge 4 providing a boundary or stop at the outer end of each serrated section. Each end of the member 2 is provided with an ornamental figure, such as, for instance, the arrow 7 shown.

Sleeve members 8 are movably or slidably mounted about both members within the serrated sections 5, the forward inner surface of said sleeves being provided with serrations 9 adapted to engage the serrations 5. The rearward inner surface of each of said sleeves 6 is cylindrically curved, as clearly illustrated in Fig. 4, at 8. Thus, by this provision the sleeve is assured an intimate and secure contact with the front and rear members 1 and 2, for the cylindrical surface provides a secure contact with the member 1 whether the sleeve is in the position shown in Fig. 4, or whether said sleeve is in any inclined position to said member 2, the latter being apt to occur during a hasty attachment of our device. Thus there can be no danger under any circumstances of the device being loose and of its consequent falling from the collar.

In practical application, the leaves 19 of the collar 11 are each placed between adjacent ends of the members 1 and 2, while the sleeves 6 are in the positions shown in Figs. 2 and 3, the ends of said members being at that time separated. Then the said sleeves are moved outward toward the ends of said members until the said ends are firmly clamped against the said leaves of the collar. Thus the collar is securely held against slipping or soiling of the said leaves. Since no part of our device actually pierces the collar, the life of the latter is little endangered. When in position as shown in the application in Fig. 1, the ornamental ends 7 are visible, so that our device appears rather as an article or ornament than as one of practical advantage.

Serrated contacting end surfaces $7^a$ may be provided to insure a stronger grip.

We claim:

1. A device of the class described comprising a pair of resilient members, one of said members being of greater length than the other, a clamp rigidly joining said members at their centers, serrations on one of said members, a slidable sleeve on each side of said clamp, serrations on each sleeve adapted to engage said first-named serrations.

2. A device of the class described comprising a pair of resilient members, a clamp rigidly joining said members at their centers, serrations on one of said members, a slidable sleeve on each side of said clamp, said sleeves having two substantially vertical inner walls engaging said members, one of said walls being serrated and the other of said walls being substantially cylindrically curved.

In testimony whereof we affix our signatures.

WILLIAM BERECKY.
GEORGE MUNTEANU.